July 2, 1957

A. W. GAUBATZ 2,797,812

SELF CLEANSING FILTER

Filed June 29, 1953

INVENTOR
Arthur W. Gaubatz
BY
Paul Fitzpatrick
ATTORNEY

2,797,812
SELF CLEANSING FILTER

Arthur W. Gaubatz, Indianapolis, Ind., assignor to General Motors Corporation, Detroit, Mich., a corporation of Delaware Application June 29, 1953, Serial No. 364,750

5 Claims. (Cl. 210—312)

This invention relates to liquid filters and more particularly to a self cleansing filter of the multiple strainer disk type.

Multiple strainer disk filters are extensively used in liquid fuel supply systems for various types of combustion engines. These filters are relatively inexpensive and effectively remove particulate foreign matter from the fuel. Any filter will eventually clog up in service and this type of filter is no exception. Investigation of clogged up filters of this type revealed that the clogging up was primarily restricted to the surface of the strainer disks, i. e., surface accumulation of foreign matter clogged the strainer disks long before a clogging concentration of foreign matter built up in the interior of the strainer disks.

An object of this invention is to prevent premature clogging of multiple strainer disk filters from surface accumulation of dirt to extend the effective life of the filter.

Further objects and advantages of the present invention will be apparent from the following description, reference being had to the accompanying drawings wherein a preferred form of the present invention is clearly shown.

Figure 1:
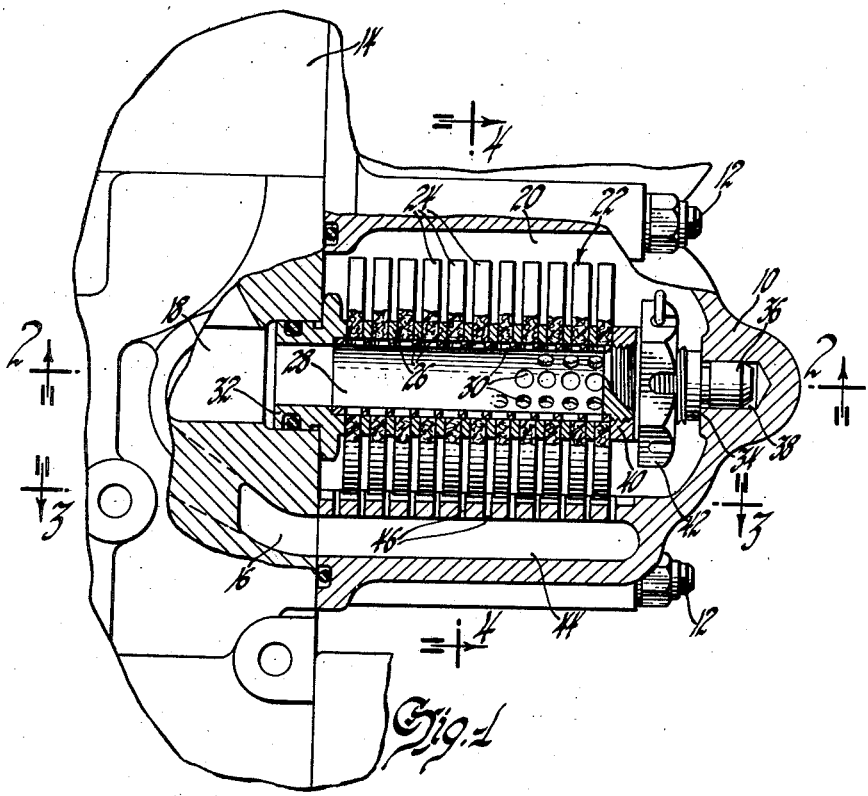
Fig. 1 is a partial top view, partially broken away, of a fuel filter assembly in accordance with the invention.
Figure 2:
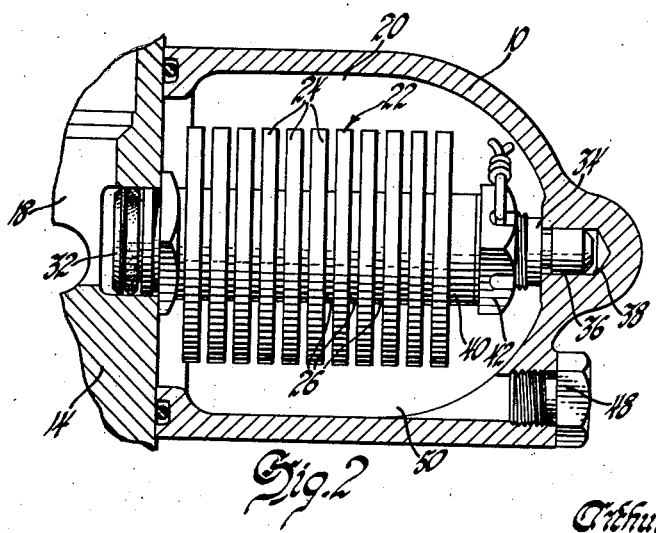
Fig. 2 is a section taken substantially along the plane indicated by the line 2—2 of Fig. 1.
Figure 3:
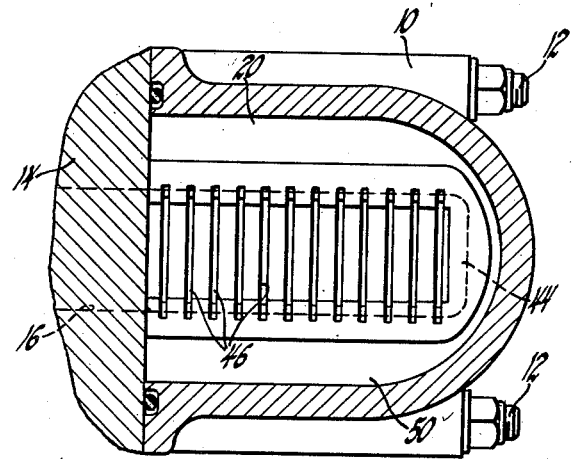
Fig. 3 is a section taken substantially along the plane indicated by the line 3—3 of Fig. 1.
Figure 4:
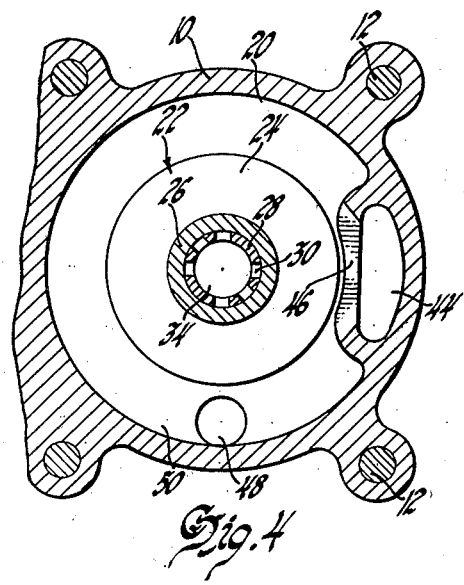
Fig. 4 is a section taken substantially along the plane indicated by the line 4—4 of Fig. 1.

Referring now to the drawings in detail, the filter assembly includes a casing 10 secured by studs 12 to a fuel distribution housing 14 which housing includes a fuel supply passage 16 to the filter and a fuel return passage 18 from the filter. Located within a generally annular chamber 20 in the casing 10 is a removable filter element 22. The filter element 22 includes a plurality of fine wire mesh strainer disks 24 spaced from each other by a plurality of interposed washers 26 of lesser diameter all supported on a tube 28 having spaced perforations 30 throughout its entirety. An annular sleeve 32 is welded to one end of the perforated tube 28 placing its interior in communication with the fuel outlet passage 18 and a threaded plug 34 is welded to the opposite end of the perforated tube to close the same which plug includes a pilot pin 36 slidably received in a bore 38 in the casing 10. A threaded bushing 40 and lock nut 42 secure the strainer disks 24 and spacer washers 26 on the perforated tube 28. Running lengthwise with the supply chamber 20 of the casing 10 is an oval manifold chamber 44 communicating therewith by a series of elongated slots 46 so spaced relative the strainer disks 24 as to lie therebetween. The manifold chamber 44 communicates with the fuel supply passage 16 in the housing 14 and is located above the sediment drain plug 48 in the bottom portion 50 of the supply chamber 20.

In operation, unfiltered fuel enters the manifold chamber 44 from the supply passage 16 and is discharged from the manifold chamber 44 into the supply chamber 20 through the elongated slots 46. The fuel discharges through the elongated slots 46 in flat fan-like jet streams between the disks, each flat stream being in substantial alignment with the opposed flat surfaces of the strainer disks to keep foreign matter washed clear of the surfaces. The fuel passes through the strainer disks between the washers 26, through the perforations 30 of the tube 28, and discharges into the outlet passage 18. A major portion of foreign matter settles in the lowermost portion 50 of the supply chamber 20 for periodic removal by means of the sediment drain plug 48, but some foreign matter will of course accumulate in the strainer disks. By bathing the flat surfaces of the strainer disks in a direction substantially parallel thereto, surface accumulation of foreign matter is prevented, and any accumulation of foreign matter is substantially evenly distributed through the strainer disks so that their permissible service life is greatly increased.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. A liquid filter comprising a chamber, a plurality of parallel spaced elongated inlets of substantial depth for delivering dirty liquid into the chamber in a plurality of flat parallel spaced streams, and a strainer having a plurality of flat parallel spaced inlet surfaces for dirty liquid in the chamber and a corresponding plurality of lateral edge outlets for strained liquid, the chamber inlets and the strainer inlet surfaces being so located respective each other that the flat streams of dirty liquid are directed toward said outlets in adjacent offset alignment with respective strainer inlet surfaces to wash away surface accumulations of strainer clogging dirt.

2. A liquid filter according to claim 1 wherein the strainer includes a plurality of strainer disks stacked together in spaced relation.

3. A liquid filter according to claim 1 wherein the strainer is wholly located within the chamber and includes a plurality of alternating washers and strainer disks stacked together on a perforated outlet tube.

4. A liquid filter according to claim 3 wherein the spaced inlets for the chamber are spaced slots in the chamber wall located between the strainer disks.

5. A liquid filter according to claim 4 wherein the bottom of the chamber is provided with a sediment drainage plug and the slots in the chamber wall are located well above the bottom of the chamber.

References Cited in the file of this patent

UNITED STATES PATENTS

| | | |
|---|---|---|
| 586,662 | Holmes | July 20, 1897 |
| 647,099 | Krause | Apr. 19, 1900 |
| 1,219,796 | Atkins | Mar. 20, 1917 |
| 1,230,328 | Sailer | June 19, 1917 |
| 1,552,902 | Werner | Sept. 8, 1925 |
| 1,653,473 | Schulz | Dec. 20, 1927 |
| 2,455,486 | Hicks | Dec. 7, 1948 |
| 2,651,418 | Prendergast | Sept. 8, 1953 |